Patented Dec. 18, 1951

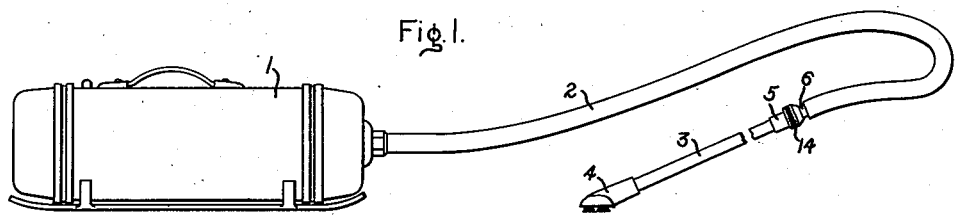
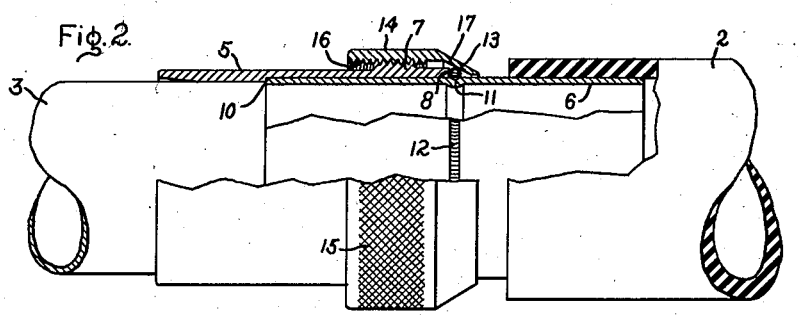
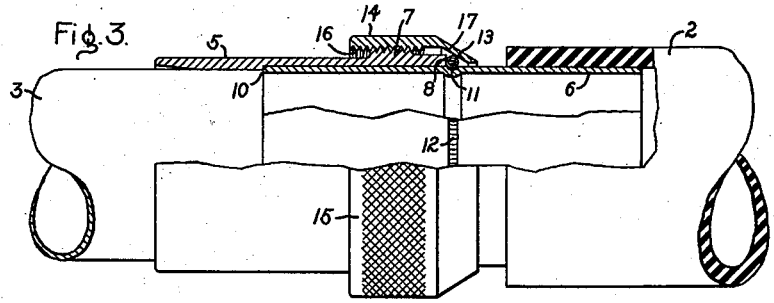
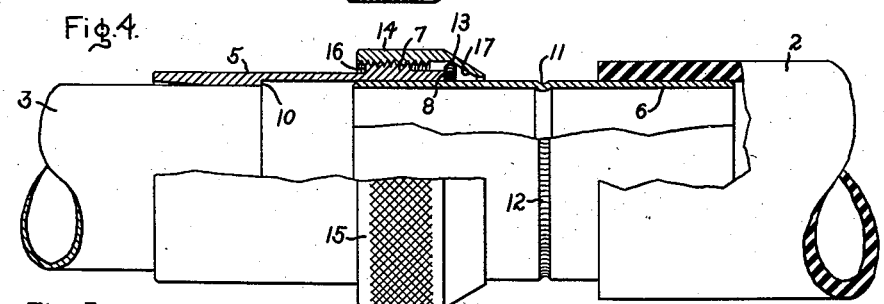
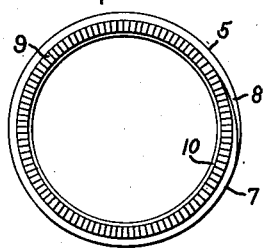
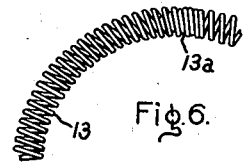
Inventor:
Victor J. Grumblatt,
by
His Attorney.

2,579,314

UNITED STATES PATENT OFFICE 2,579,314

SWIVEL AND LOCKING CONNECTION FOR TUBES

Victor J. Grumblatt, East Cleveland, Ohio, assignor to General Electric Company, a corporation of New York Application June 22, 1950, Serial No. 169,626

3 Claims. (Cl. 285—122)

My invention relates to swivel connections between tubes or tubular members where it is desired at times to lock the swivel against movement. My invention is particularly useful in making connections or couplings between tubes or tubular elements in so-called suction cleaners and blowers. It will be shown as applied to a joint between a suction hose end and a tubular "wand" section, but obviously the improved connection or coupling could be applied to the joint between a hose and a cleaner body, or a joint between a rigid wand and the end of a cleaning tool, or between two wand sections.

One object of my invention is to obtain not only a readily separable swivel joint at a desired location, as is usual in many structures of this character, but also to provide in such a joint a means for positively locking the joint at any position of swiveling. This produces a joint or coupling which may function as a swivel between two adjacent tubular sections but which, upon adjustment, may lock the two sections together or release the two sections for separation from each other.

A further object of my invention is to make a locking swivel joint of the character described with no increase in the number of parts required over ordinary separable swivel joints.

The principal objects of my invention are obtained by substituting a toothed expanding locking ring for the ordinary smooth split ring of joints of this character, and by knurling or serrating adjacent surfaces of the sleeves or tubes which are joined. The toothed ring can, therefore, lock the two sleeves together, or be adjusted so that swiveling may take place without locking or so that the sleeves may be readily separated.

Other objects and further details of that which I believe to be novel and my invention will be clear from the following description and claims taken with the accompanying drawing in which is illustrated an example of swivel and locking connection embodying the present invention and incorporating the toothed expanding locking ring and knurled or serrated surfaces above referred to.

In the drawing, Fig. 1 is an elevation of a suction cleaner showing my invention applied to the coupling between the cleaner hose and a rigid tubular wand; Fig. 2 is an enlarged sectional view of the coupling with the parts shown in locked position; Fig. 3 is a similar sectional view showing the parts adjusted to the swiveling position; Fig. 4 is a similar sectional view with the parts in their uncoupled position; Fig. 5 is an end view of the outer sleeve or element of my coupling; and Fig. 6 is an enlarged fragmentary view of the locking ring in my invention.

My invention is particularly useful in cases where a separable swiveled joint is now used, where it is also desirable to have the swivel locked at times. As shown, it may be applied to a suction cleaner having a body 1 containing the usual suction producing and dirt collecting elements (not shown), to which body is removably connected a flexible hose 2 which in turn is removably connected to a tubular wand 3 of rigid metal or other material which detachably carries a nozzle or other cleaning attachment 4 at its outer end. The connection or coupling of my invention may be used between any one or all of the above elements 1 through 4 although I have shown it as applied between the hose 2 and the wand 3.

The two principal parts of a coupling according to my invention include an outer swivel tube or sleeve 5 and a second inner tubular sleeve 6 which fits telescopically inside of the outer tube. The outer sleeve is firmly secured to or made integral with one of the tubular members of the joint, shown here as the wand. For the purpose of assisting in joining to the other member of the coupling, as explained later, this outer swivel sleeve is provided on its outside near its end with a threaded portion 7. This outer sleeve has an end surface 8 which is serrated or knurled as at 9, as best shown in Fig. 5.

The inside of this outer sleeve has a circumferential stepped seating portion 10 which slidably and rotatably receives the inner sleeve, the step acting as a stop to limit the distance of insertion of the inner sleeve within the outer sleeve.

The inner sleeve 6 is firmly secured to or made integral with the other tubular member to be joined, shown here as the hose. This inner member is provided with a circumferential groove 11 on its outside which is located right next to the knurled end surface 9 of the outer sleeve when the inner sleeve is fully seated in the outer sleeve as shown in Figs. 2 and 3.

The member which actually holds the two coupling sections together is the normally expanded garter spring 13 shown here in the form of a cylindrical spiral spring having its ends screwed together or otherwise joined as at 13a, as shown in Fig. 6, to form an annulus or garter. This coiled spring locking ring provides teeth for engagement with the serrations 9 of the outer sleeve and with the serrations 12 in the groove of the inner sleeve. When relaxed, the spring ring expands to a larger diameter than the outside of the inner sleeve, but it can be compressed to a diameter small enough so that its turns or coils act as teeth to engage with the serrations in the groove 11.

For controlling the diameter of the garter spring locking ring, I provide a swivel attachment nut 14, preferably roughened or knurled as at 15 on its outer surface for ease in gripping and turning. This nut has an inner threaded portion 16 which engages and co-operates with the threads 7 on the outer sleeve. As is apparent from the drawing, this nut member surrounds the locking ring 13 and, through an inner tapered bearing portion 17 on the nut, controls the diameter of the spring ring. This tapered portion tapers from its largest diameter near the threads 16 to its smallest diameter near the end of the nut and extends over the end of the outer sleeve in all positions of the nut. The largest diameter of the tapered portion permits full expansion of the spring ring so that the inner sleeve can be easily inserted into or removed from the outer sleeve without interference from the spring ring. The smallest diameter of the tapered portion is small enough to compress the spring so that it will seat in the serrations 12 in the groove 11 to lock the sleeves together when the nut is tightened. Obviously the spring ring engages against the end 8 of the outer sleeve at one side, and against the tapered inner surface of the nut on its other side at the outside. The locking position of the spring ring and other parts is shown in Fig. 2. The fully expanded position of the locking ring so that the tubes may be disengaged is shown in Fig. 4. In an intermediate position of adjustment of the nut as shown in Fig. 3, the locking spring, although still within the groove 11, is sufficiently expanded to be released from the serrations 12 so that the two sleeves can swivel freely but cannot be separated.

Because the spring is of a size so that it normally tends to expand towards its largest possible diameter, it urges itself always toward the largest end of the tapered bearing portion within the nut and holds itself there against the knurled end on the outer swivel tube. Preferably, the serrations 9 on the outer tube and the serrations 12 in the groove 11 are made of approximately the same size as the turns or "teeth" on the spring 13 so that positive locking is obtained between the parts when the nut is tightened. Obviously, when the nut is tightened, the spring is pushed by the end of the outer sleeve toward the smaller end of the tapered bearing portion, and is compressed inwardly by the tapered surface on the nut toward the inner tubular sleeve to a degree dependent upon the amount of tightening of the nut.

In place of the locking spring ring shown, other self-expanding "toothed" locking rings might be designed, but the cylindrical spring annulus is the simplest way of obtaining teeth on both the inner surface and the side surface of the ring opposite the serrated or knurled portions of the sleeves.

As will be evident from the foregoing description, certain aspects of my invention are not limited to the particular details of construction of the example illustrated, and I contemplate that various and other modifications and applications of the invention will occur to those skilled in the art. It is, therefore, my intention that the appended claims shall cover such modifications and applications as do not depart from the true spirit and scope of my invention.

What I claim as new and desire to secure by Letters Patent of the United States is:

1. A coupling for suction cleaner tubes and the like comprising an outer sleeve, an inner sleeve telescopically fitting into an end of the outer sleeve, a nut threaded on the outer sleeve, a tapered inner wall on the nut extending over the end of the outer sleeve, a resilient normally expanded compressible toothed locking ring inside said nut next to said tapered wall and next to said end on the outer sleeve, and serrations on said outer sleeve end and on said inner sleeve engageable by said toothed locking ring to lock said sleeves together against rotation when said nut is tightened and said tapered wall compresses said ring.

2. A swivel and locking coupling for tubular sleeves comprising an outer sleeve, an inner sleeve telescopically fitting into an end of the outer sleeve, a nut threaded on the outer sleeve, a tapered inner bearing wall on the nut extending over the end of the outer sleeve, a normally expanded compressible coiled spring locking ring inside said nut next to said tapered wall and next to said end on the outer sleeve, and serrations on said outer sleeve end and on said inner sleeve engageable by the coils of said locking ring to lock said sleeves together against rotation when said nut is tightened and said tapered wall compresses said ring, said serrations on said inner sleeve being located in a groove surrounding said sleeve next to said outer sleeve end when said inner sleeve is fitted into said outer sleeve.

3. A coupling for tubular sections comprising an outer tubular sleeve, a stepped seating portion in said sleeve, an inner tubular sleeve telescopically fitting into the outer sleeve against said seating portion, a nut member threadedly engaging the outer sleeve, a tapered inner bearing wall on the nut extending over and tapering toward an end of the outer sleeve, a normally expanded compressible coiled spring locking ring inside said nut next to said tapered wall and next to said end on the outer sleeve, a circumferential groove around the inner sleeve located to be opposite the end of the outer sleeve when said inner sleeve is seated in said outer sleeve, and serrations on said outer sleeve end and in said groove engageable by the coils of said locking ring to lock said sleeves together against rotation when said nut is tightened and said tapered wall compresses said ring, said tapered wall allowing expansion of said ring to release said spring from said serrations in the groove for swiveling of the sleeves when the nut is loosened.

VICTOR J. GRUMBLATT.

REFERENCES CITED

The following references are of record in the file of this patent:

UNITED STATES PATENTS

| Number | Name | Date |
| --- | --- | --- |
| 1,754,639 | Meyer | Apr. 15, 1930 |
| 2,111,956 | Baldwin | Mar. 22, 1938 |
| 2,455,544 | Yonkers | Dec. 7, 1948 |